United States Patent
Lam et al.

(10) Patent No.: US 9,113,204 B1
(45) Date of Patent: Aug. 18, 2015

(54) METHOD AND APPARATUS FOR COMMUNICATING INTERACTIVE CONTENT IN A BROADCAST COMMUNICATION SYSTEM

(75) Inventors: Thai Lam, Torrance, CA (US); Mark T. Takamoto, Pacoima, CA (US)

(73) Assignee: The DIRECTV Group, Inc., El Segundo, CA (US)

( * ) Notice: Subject to any disclaimer, the term of this patent is extended or adjusted under 35 U.S.C. 154(b) by 1462 days.

(21) Appl. No.: 12/482,179

(22) Filed: Jun. 10, 2009

(51) Int. Cl.
*H04N 7/173* (2011.01)
*H04N 21/442* (2011.01)

(52) U.S. Cl.
CPC .................................. *H04N 21/442* (2013.01)

(58) Field of Classification Search
None
See application file for complete search history.

(56) References Cited

U.S. PATENT DOCUMENTS

2002/0095684 A1* 7/2002 St. John et al. ............... 725/95
2003/0217362 A1* 11/2003 Summers et al. ............. 725/63

* cited by examiner

*Primary Examiner* — Cai Chen

(57) ABSTRACT

A system and method for communicating with a user device includes an interactive headend having an interactive content manager, an interactive event scheduler and queue manager communicating with a queue. A broadcast channel management system communicates bandwidth allocation data to the interactive head end. The interactive head end forms a queue corresponding to the bandwidth allocation data. The interactive event scheduler schedules the interactive broadcast with the queue and issues a start command. The queue manager pulls content from the interactive content manager and communicates interactive content from the queue to the user device.

25 Claims, 7 Drawing Sheets

METHOD AND APPARATUS FOR COMMUNICATING INTERACTIVE CONTENT IN A BROADCAST COMMUNICATION SYSTEM

TECHNICAL FIELD

The present disclosure relates generally to a communication system, and, more specifically, to a system and method for scheduling content for distribution by the communication system.

BACKGROUND

The statements in this section merely provide background information related to the present disclosure and may not constitute prior art.

Satellite television is increasing in popularity due to the ever-increasing amount of programming as well as the quality of programming. Programming includes standard national (CONUS) broadcasts, local or regional station broadcasts, on-demand content and interactive content. Interactive content is increasing in popularity.

Satellite television broadcast systems typically use several satellites. Each satellite has several transponders that receive signals from the ground and broadcast the signals to users. Each transponder is capable of providing a certain amount of content therethrough. That is, each transponder may provide a certain bit rate therethrough.

As the channels change from different levels or quality of content, such as high definition versus standard definition, the bit rates may change. Also, satellite programming provides occasional programming or channels that are not constantly broadcast. Pay-per-view content, sporting events and interactive television are examples of occasional content that is provided.

Interactive content must be scheduled both in terms of time and bandwidth so that it can be directed to users at a particular time. However, scheduling interactive content may be a cumbersome task. Typically, multiple systems and interactions are required to perform the scheduling.

SUMMARY

The present disclosure provides a system for efficiently and accurately providing interactive content to users.

In one aspect of the disclosure, a method includes allocating a bandwidth for an interactive broadcast, forming a queue corresponding to the bandwidth, scheduling the interactive broadcast to the queue, issuing a start command, pulling content from an interactive content manager using the queue manager and communicating the content from the queue to a user device.

In a further aspect of the disclosure, a system for communicating with a user device includes an interactive headend having an interactive content manager, an interactive event scheduler and queue manager communicating with a queue. A broadcast channel management system communicates bandwidth allocation data to the interactive head end. The interactive head end forms a queue corresponding to the bandwidth allocation data. The interactive event scheduler schedules the interactive broadcast with the queue and issues a start command. The queue manager pulls content from the interactive content manager and communicates interactive content from the queue to the user device.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

Figure 1:
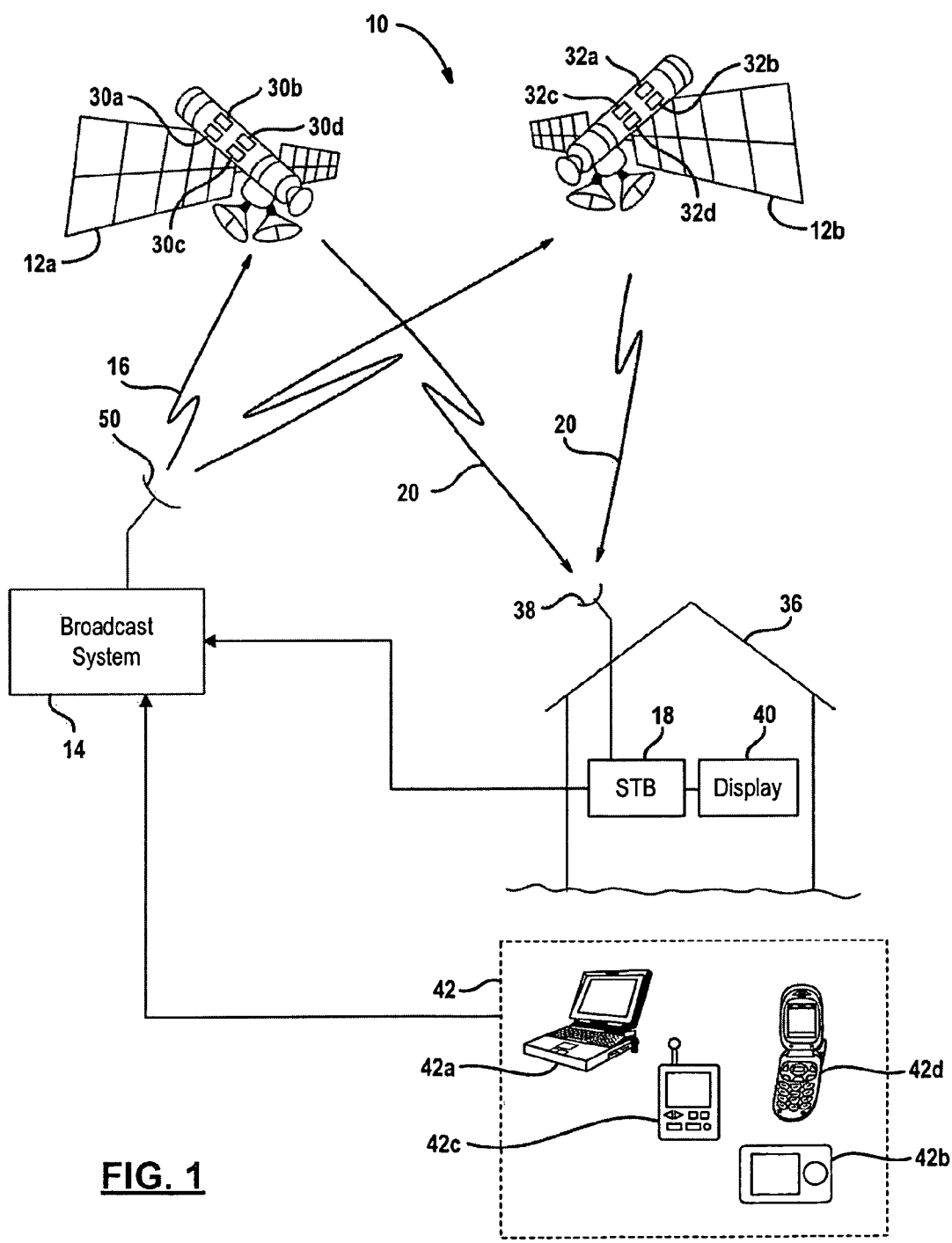
FIG. 1 is a system level view of the communication system according to the present disclosure.

The following description is merely exemplary in nature and is not intended to limit the present disclosure, application, or uses. For purposes of clarity, the same reference numbers will be used in the drawings to identify similar elements. As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality. As used herein, the phrase at least one of A, B, and C should be construed to mean a logical (A or B or C), using a non-exclusive logical OR. It should be understood that steps within a method may be executed in different order without altering the principles of the present disclosure.

The present disclosure is set forth with respect to a satellite broadcast television system. In particular, the following disclosure is made with respect to DIRECTV® broadcast services and systems. It should be understood that many other delivery systems are readily applicable to disclosed systems and methods. Such systems include other wireless distribution systems, wired or cable distribution systems, cable television distribution systems, Ultra High Frequency (UHF)/Very High Frequency (VHF) radio frequency systems or other terrestrial broadcast systems (e.g., Multi-channel Multi-point Distribution System (MMDS), Local Multi-point Distribution System (LMDS), etc.), Internet-based distribution systems, cellular distribution systems, power-line broadcast systems, any point-to-point and/or multicast Internet Protocol (IP) delivery network, and fiber optic networks. Further, the different functions collectively allocated among a head end (HE), integrated receiver/decoders (IRDS) and a content delivery network (CDN) as described below can be reallocated as desired without departing from the intended scope of the present patent.

Further, while the following disclosure is made with respect to the delivery of video (e.g., television (TV), movies, music videos, etc.), it should be understood that the systems and methods disclosed herein could also be used for delivery of any media content type, for example, audio, music, data files, web pages, etc. Additionally, throughout this disclosure reference is made to data, content, information, programs, movies, assets, video data, etc., however, it will be readily apparent to persons of ordinary skill in the art that these terms are substantially equivalent in reference to the example systems and/or methods disclosed herein. As used herein, the term title will be used to refer to, for example, a movie itself and not the name of the movie.

Referring now to FIG. 1, a satellite communication system 10 is illustrated having a first satellite 12a and a second satellite 12b. The communication system 10 may be a satellite television system or data distribution system.

The system 10 may include a broadcast system 14 for generating uplink signal 16 to the satellites 12a and 12b. The signals may correspond to various channel streams or multiplex channel streams that are communicated from the satellites 12a, 12b to a fixed user device 18 through downlinks 20. Only one user device 18 is illustrated by way of example. However, a system 10 may include several user devices.

Satellite 12a may include a plurality of transponders of which four are illustrated as reference numerals 30a-30d. The satellite 12b may also include a plurality of transponders including transponders 32a-32d. The transponders 30a-30d and 32a-32d receive the uplink signals from the broadcast system 14 and direct the signal, such as television signals, through the downlinks 20 to various users. The downlink signals 20 may be Continental United States (CONUS) or may be spot beam signals. As will be further described below, various allocations of channel signals to the various transponders may be provided. Transponders 30a, 30b, 32a and 32b are uplink transponders. Transponders 30c, 30d, 32c and 32d are downlink transponders. Although only four are illustrated, several different uplink transponders and downlink transponders may be provided in each satellite.

The user device 18 may comprise a set top box (STB) disposed within a home or business 36. An antenna 38 is used to receive the downlink signals 20 and provide them to the user receiving device 18. The user receiving device 18 may be in communication with a display 40 for displaying the channel signals. The user device 18 may communicate interactive signals to the broadcast system 14 through various means include a wired or wireless network.

Another type of user device may also be included in the system, a mobile receiving device 42. A plurality of mobile receiving devices is illustrated in box 42. A portable computer 42a, a portable media player 42b, a personal digital assistant 42c and a cellular telephone 42d are illustrated. Each of the devices includes an antenna that may be integral therewith for receiving the downlink signals 20. Different types and numbers of mobile devices may also be included in the system. It should be noted that both fixed and mobile user devices may be included. Of course, either fixed or mobile alone may be used in a system. The mobile device 42 may also communicate interactive signals to the broadcast system 14 through various means include a wired or wireless network.

The broadcast system 14 includes an antenna 50 for uplinking uplink signal 16 to satellites 12a and 12b. Although only one antenna 50 is illustrated for simplicity purposes, more than one antenna may be used.

Figure 2:
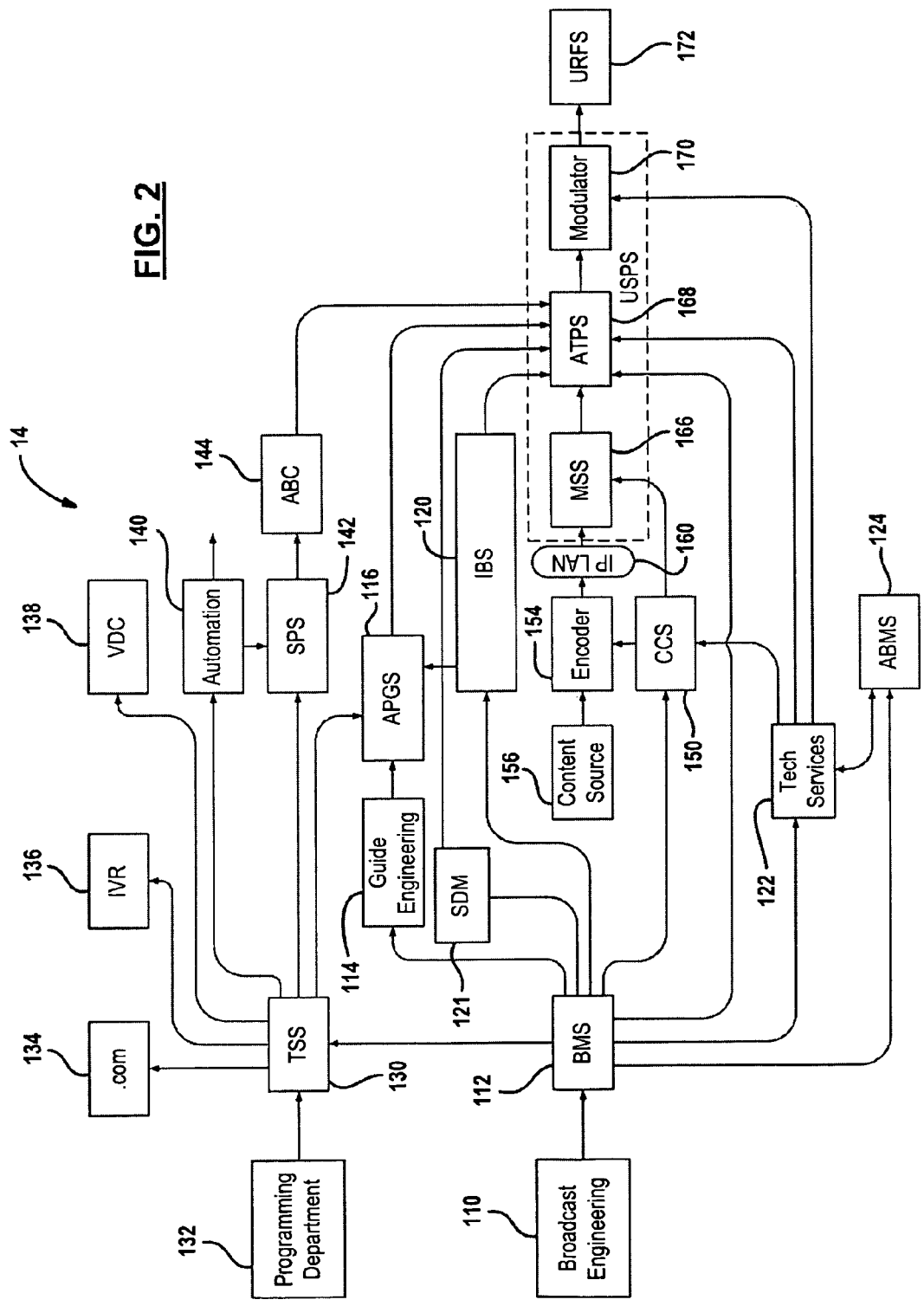
FIG. 2 is a block diagrammatic view of the broadcast system 14 of FIG. 1.

Referring now to FIG. 2, a block diagrammatic view of the broadcast system 14 of FIG. 1 is illustrated in further detail. The broadcast system 14 includes a broadcast engineering module 110 that is used for providing various inputs to a broadcast operation channel management system (BMS) 112. One example of a BMS system is set forth in application Ser. No. 12/041,952, entitled "Asset Allocation System and Method for Allocating Satellite Resources in a Satellite Broadcast Communication System" filed on Mar. 4, 2008, the disclosure of which is incorporated by reference herein. The BMS system 112 is used to allocate the resources of the satellites 12a and 12b illustrated in FIG. 1. Each transponder in the satellites is capable of providing various throughput which is referred to as a bit rate. The BMS system 112 provides a centralized and automated system to manage and maintain the information for a bit rate allocation chart in a database and communicates various data to various components of the broadcast system 14.

The BMS 112 may provide boot packet identifiers (PIDs) and rates to a guide engineering module 114. Guide engineering 114 may receive the data in various formats including email. Guide engineering 114, in turn, uses the information received to form the program guide in the advanced program guide system 116.

The BMS 112 may also be used to provide channel and program identifier assignments to an interactive broadcast system (IBS) head end 120. The interactive broadcast system provides functions for creating a streaming service, associating content channels with the service, scheduling the services, informing the advance programming guide system 116 of changes in the channel objects and requesting the broadcast the streaming services and necessary metadata. Content channels may not correspond to what is thought of as a broadcast channel. That is, content channels may correspond to a broadcast channel but may also include several broadcast channels.

The BMS 112 may provide interactive television (iTV) channel data, PID assignments and rates via XML to the IBS 120.

The BMS 112 may also be in communication with a software download manager (SDM) 121. The BMS 112 may interface with the SDM 121 and the IBS 120 using an XML-based web service. The SDM 121 may receive SWDL channel, data PID assignments and rates from the BMS 112.

The BMS 112 may also be in communication with a technical services module 122. The technical services module 122 may receive various bit rate allocation chart information. Bit rate allocation chart information may also be provided from the BMS 112 to an advanced broadcasting monitoring system (ABMS) 124. The advanced broadcasting monitoring system 124 may be used to monitor the quality of signals throughout various portions of the broadcasting system 14.

The BMS 112 may also provide channel definition and mapping data to a traffic and scheduling system 130. The traffic scheduling system 130 may receive a program schedule from a programming department 132. The traffic and scheduling system 130 may generate schedules to a dot com (.com) module 134 used for ordering various content through an external computer interface. The data from the traffic and scheduling system 130 may also be provided to an interactive voice recognition (IVR) system 136 that also may be used to order various content.

The traffic and scheduling system 130 may also provide information to a VDC system 138.

The traffic and scheduling system 130 may also provide scheduling information to an automation system 140. The automation system and the traffic and scheduling 130 may be in communication with a scheduled pad server 142. The scheduled pad server 142 may receive program-associated data (PAD). The scheduled pad server 142 delivers program-associated data to an advance broadcast controller 144.

The BMS 112 may provide compression control system configuration data to a compression control system 150. The compression control system 150 may provide data to an encoder 154. The compression control system 150 may provide the data to the encoder 154 for configuring the encoder 154. The encoder 154 may receive content from a content source 156. The content source 156 may various live content sources provided from satellite or fiber. The content sources may also be based on file or tape-based content received from a content repository. The encoder 154 may be used to encode the various content from the content source 156 according to the configuration provided from the compression control system 150. The encoder 154 may communicate the encoded signals through a local area network such as an Internet protocol local area network 160. Of course, various numbers of encoders 154 may be provided.

The output of the encoders may be referred to as a single program transport stream (SPTS). The local area network 160 may include a plurality of routers or the like to route the single transport streams to one of a plurality of uplink signal processing systems 164. Each uplink signal processing system may correspond to the output of a single transponder within one of the satellites 12a, 12b.

The uplink signal processing system 164 may include a multiplexing splicing system (MSS) 166, an advanced transport processing system (ATPS) 168 and a modulator 170. Although not shown, multiple components within the uplink signal processing system may have redundant systems.

The advance transport processing system 168 may receive various data signals from the advance broadcast controller 144, the advance program guide system 116, the interactive streaming server 120 of the interactive head end 120, the BMS 112 and technical services 122. The multiplexing splicing system 166 may also receive configuration information from the compression control system 150. The compression control system 150 may generate configurations so that the multiplexing splicing system 166 receives the desired single-program transport streams through the LAN 160.

The tech services module 122 may also be in communication with the modulator 170 to provide configuration and feedback for the modulator 170.

The output of the modulator is in communication with an uplink RF system (URFS) 172. The uplink RF system 172 generates the uplink signal 16 as illustrated in FIG. 1. The uplink RF system may include the antenna 50 of FIG. 1.

It should be noted that various configurations of the block diagrammatic view illustrated above, may be provided. For example, should the output of the encoder 154 not be IP ready, the IP LAN 160 may be removed and a direct connection between an encoder and the multiplexing splicing system 166 may be provided. Further, the advance broadcast monitoring system 124 may also be eliminated.

Figure 3:
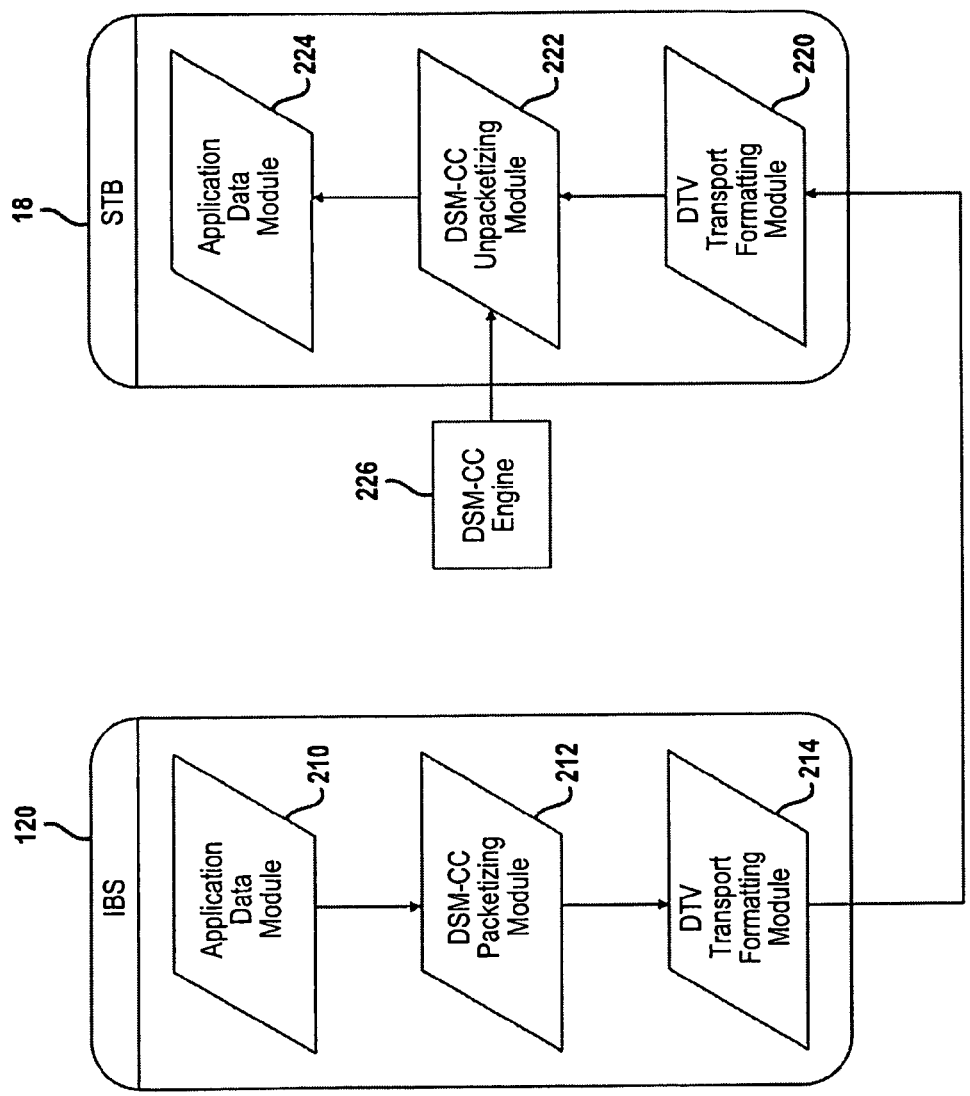
FIG. 3 is a more detailed block diagrammatic view of the broadcast system of FIG. 1.

Referring now to FIG. 3, the interactive broadcast system 120 is illustrated in further detail. The interactive broadcast system 120 includes an application data module 210 that provides application data to a digital storage media command and control (DSM-CC) packetizing module 212. The DSM-CC packetizing module 212 is used for controlling video reception and controlling features within a set top box. The packetizing module 212 packetizes the data for transport. The DTV transport formatting module 214 receives the packetized data and formats it in a format compatible with a distribution system such as the DIRECTV® distribution system.

In the set top box 18, a DTV transport formatting module 220 removes the transport formatting. Module 222 is a DSM-CC unpacketizing module that unpacketizes the data to form the application data at the application data module 224. A DSM-CC engine 226 may allow the DSM-CC unpacketizing module 222 to unpacketize the data to form the application data 224. The DSM-CC engine 226 may be provided to the set top box through download or other means for distribution.

Figure 4:
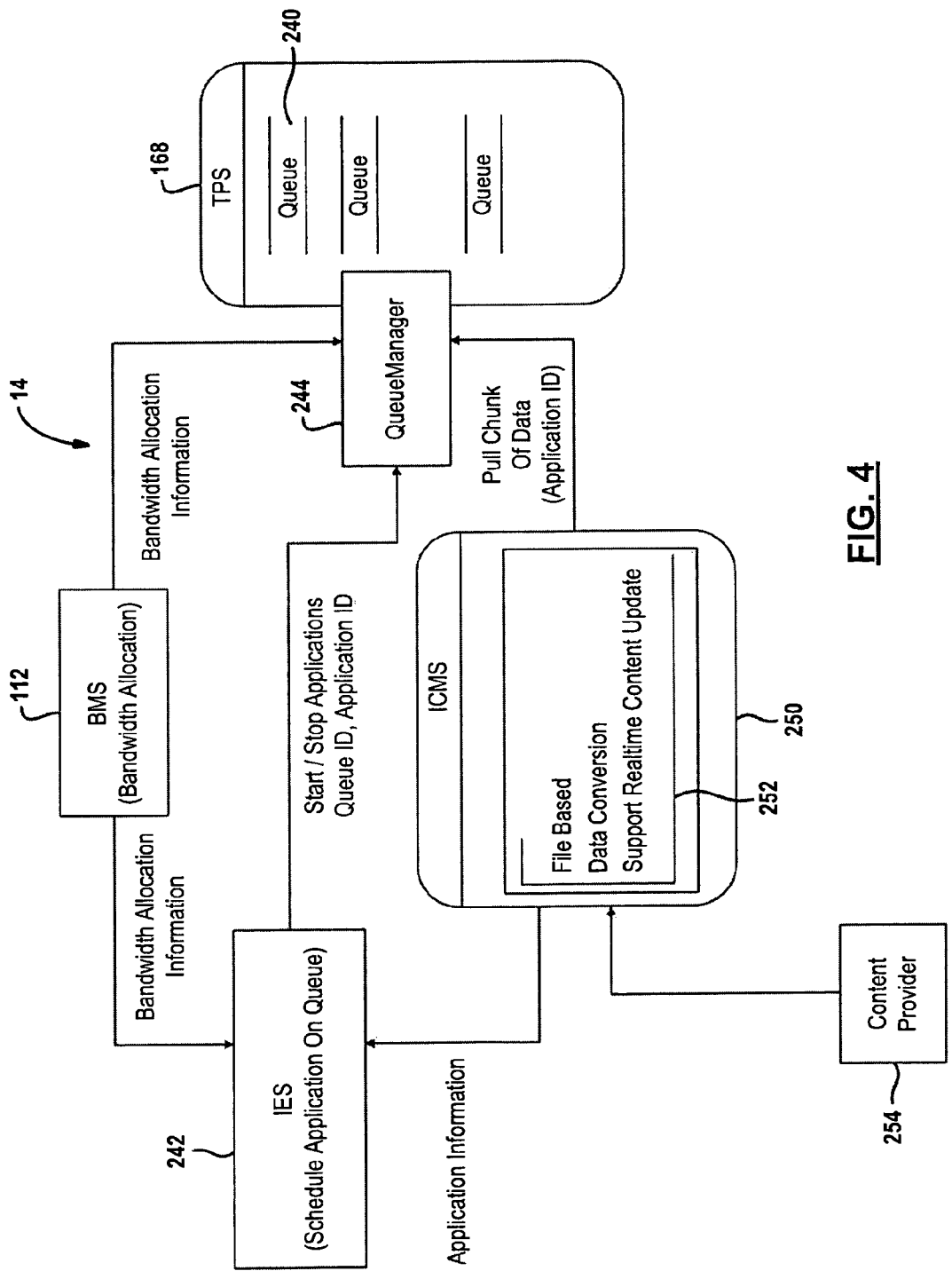
FIG. 4 is a detailed block diagrammatic view of the broadcasting system.

Referring now to FIG. 4, the system 14 is simplified and expanded to correspond to the functions of the present disclosure. The BMS 112 is used for bandwidth allocation for broadcasting interaction applications and data. The BMS 112 may allocate multiple service channel identifiers (SCIDs) with different bandwidths to the interactive broadcast system 112. The service channel identifiers may be broadcasting queues 240 within the transport processing system 168. Queue data corresponding to the bandwidth allocation are provided from the broadcast management system to an interactive event scheduler (IES) 242 and to a queue manager 244. The interactive event scheduler may schedule interactive applications onto the queues 240. Start/stop commands may also be provided from the TES 242 to the queue manager 244. Start and stop commands may provide a queue identifier and an application identifier to the queue manager 244.

The queue manager 244 streams out data for applications on a specified queue until a stop command is received. The queue manager 244 controls the speed of broadcasting based upon the bandwidth allocation on the queue.

An interactive content management system (ICMS) 250 manages interactive application data. The interactive content management system may include a file-based manager system, a data conversion system and real time content update support. These functions are illustrated by box 252 and will be described further in FIG. 5.

The interactive content management system receives interactive content from a content provider 254. Application information is provided for the content received from the content provider from the ICMS 252 the interactive event schedule 242.

The queue manager 244 pulls chunks of data based upon the application identifier from the file-based storage system of the ICMS 250. The queue manager 244 controls the pulling of chunks of data from the ICMS. The format of the data within the ICMS is irrelevant to the queue manager 244.

The ICMS provides the IES 242 metadata corresponding to data about the interactive data. Titles, content identifier, authors and various other information may be provided.

Figure 5:
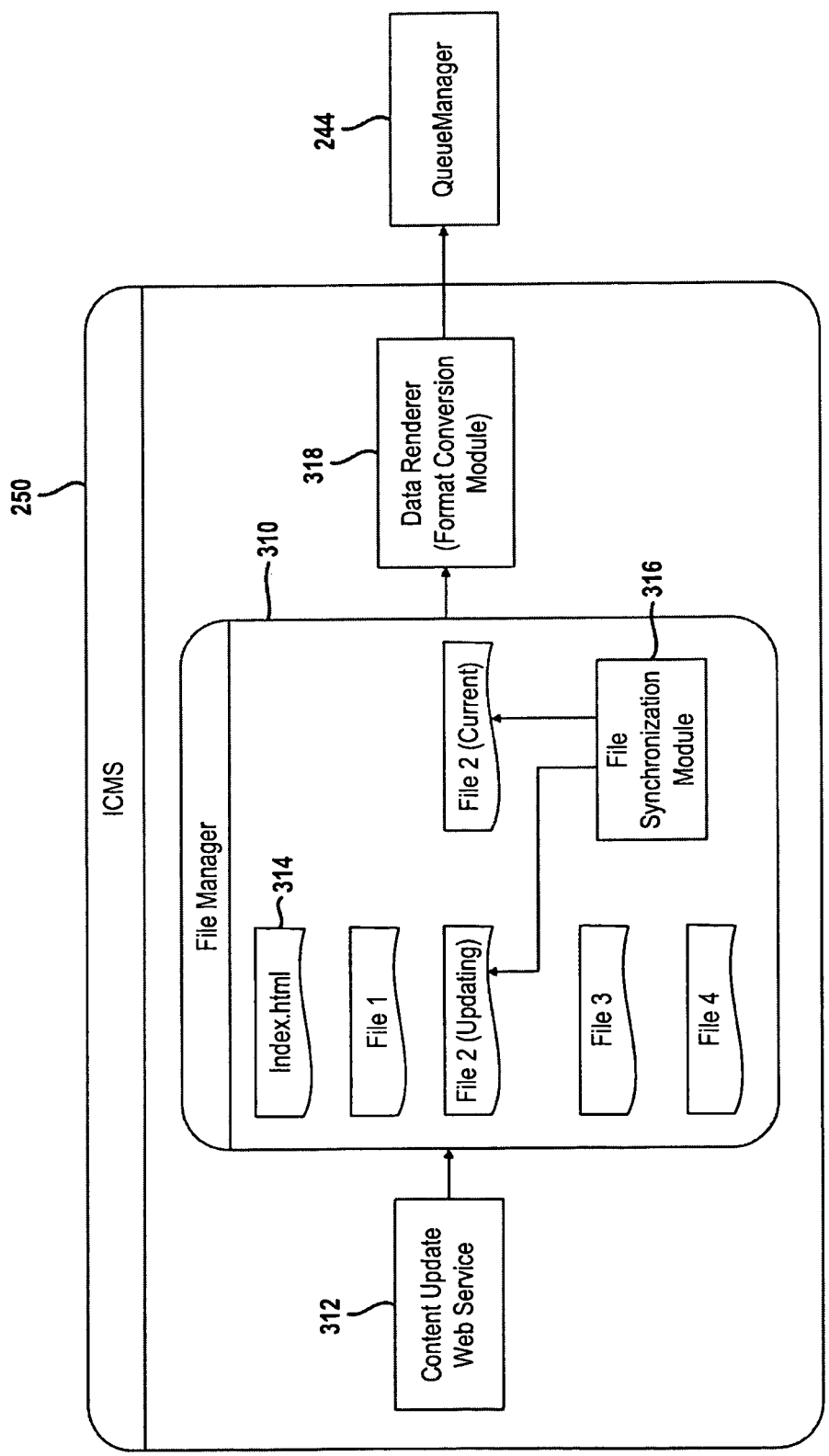
FIG. 5 is a block diagrammatic view of the interactive content management system.

Referring now to FIG. 5, the interactive content management system (ICMS) 250 is illustrated in further detail. The ICMS 250 includes a file manager 310. The file manager 310 may be coupled to a content update web service 312 that may allow the content to be updated that is stored within the file manager 310. The content update web service 312 may be in communication with the content provider 254 of FIG. 4. The file manager 310 may include an index 314. The file manager may also include a plurality of files: File 1, File 2, File 3, and File 4. A file synchronization module 316 may be used to synchronize one of the files. In this case, File 2 forms a copy so that a File 2 (Updating) and File 2 (Current) files are formed. A file may be requested to be updated through the content update web service 312. The content may be updated directly from a content provider or through the service provider. The file synchronization module 316 may allow the copy of the current file to be made which may be called the updating file. The updating file in this case is File 2 (Updating) and the current file is File 2 (Current). A modification or update is made to the updating file which in this case is File 2 (Updating). If during the updating the same file is requested, the file manager 310 returns the File 2 (Current) file rather than the File 2 (Updating) file so there is no disruption of the data stream. The file synchronization module 316 allows multiple files to be updated simultaneously. The data renderer module 318 converts the format of the files to a desired format for use by the user device.

The queue manager 214 pulls chunks of the desired file through the data renderer module 318 for communication through the transport system. The chunks may be groups of packets suitable for transmission.

It should also be noted that the content update web service 312 may also be used for injecting data into the file. For example, additional data may be injected or placed into a previous data stream.

Figure 6:
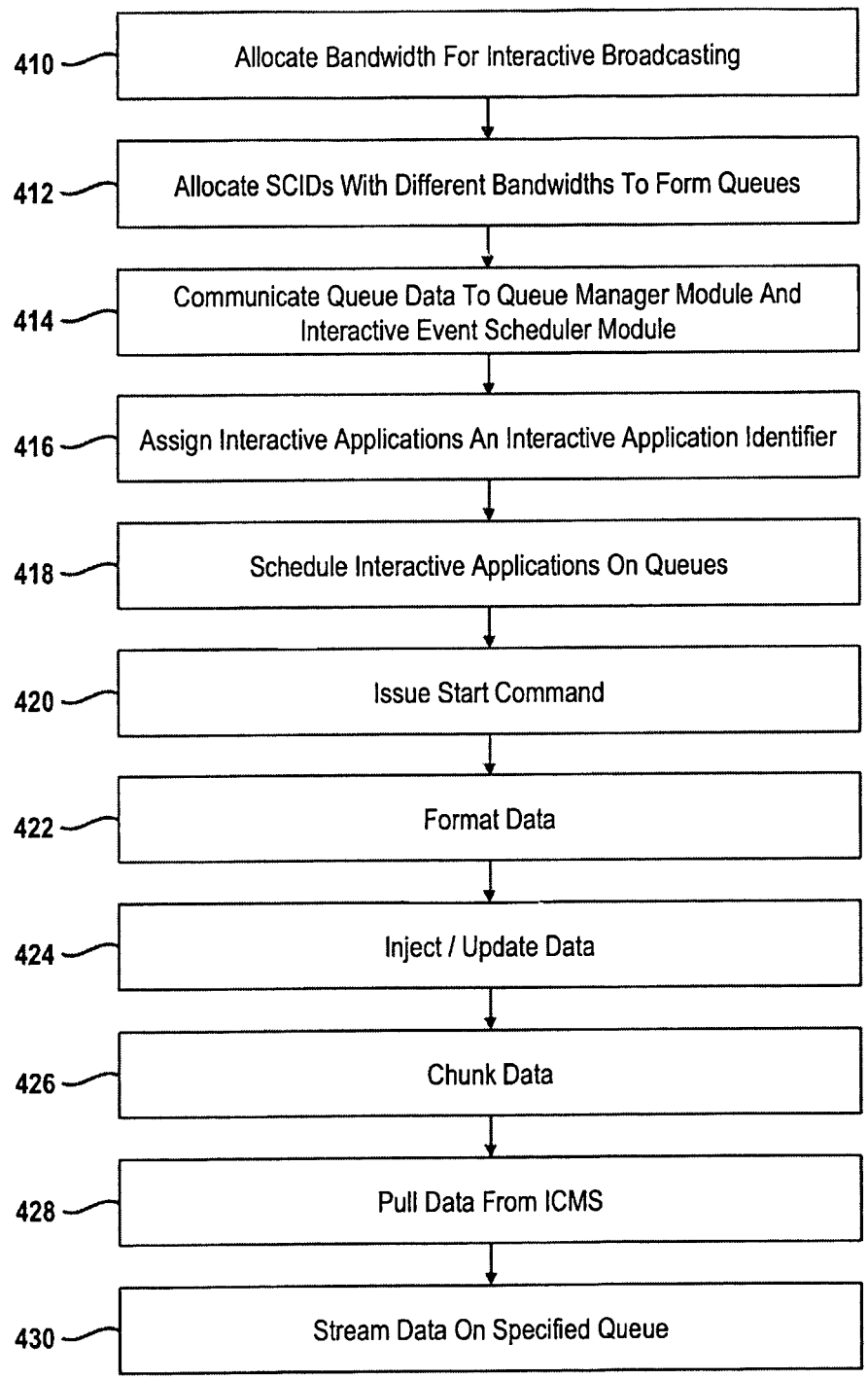
FIG. 6 is a flowchart of the method for broadcasting interactive content according to the present disclosure.

Referring now to FIG. 6, a method for broadcasting interactive content is set forth. In step 410, bandwidth for interactive broadcasting content is provided. In step 412, service channel identifiers with different bandwidths are used to form queues for communicating the interactive broadcasting data. In step 414, the interactive applications may be assigned an interactive application identifier. In step 418, the interactive applications are scheduled to the queues formed in step 412. In step 420, start commands are issued. In step 422, the data may be formatted to a desired format. It should be noted that the data may be stored in a formatted data or formatted before being provided to the queues when requested. In step 424, data is injected or updated. The updating of data is described below in FIG. 7. This is an optional step. In step 426, the data from the file manager is chunked when data is pulled from the ICMS in step 428. The data chunks may be groups of packets that may be provided to the queue manager. In step 430, the data is streamed on a specified queue to a transport system. The data may be ultimately communicated to a satellite.

Figure 7:
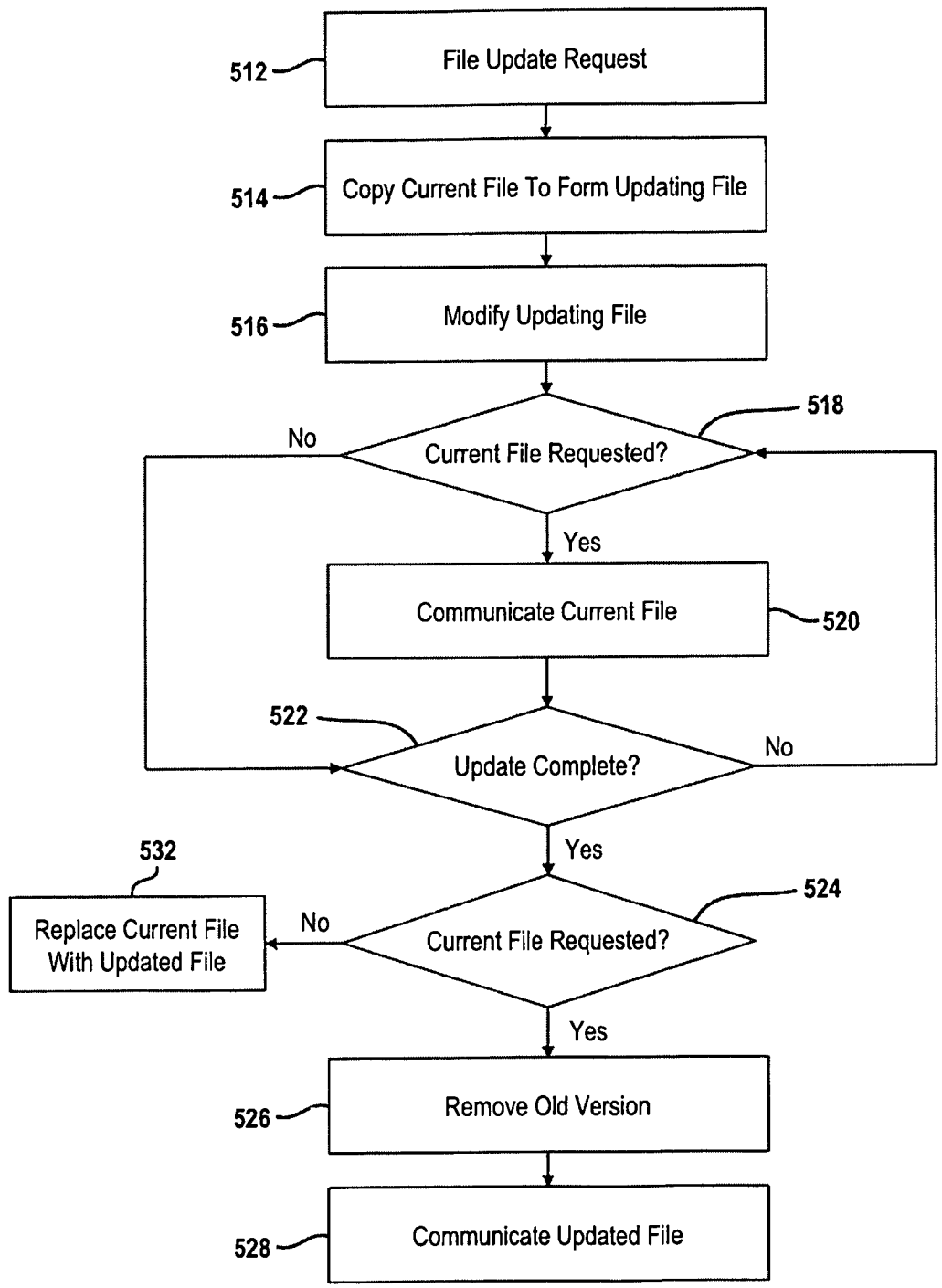
FIG. 7 is a method for updating interactive content according to the present disclosure.

Referring now to FIG. 7, a method for updating or injecting data is set forth. In step 512, a file update request is generated. In step 514, the current file is copied to form an updating file. In step 516, the updating file is modified. In step 518, if the current file is requested, the current file is communicated in step 520. If the current file is not requested or after the current file is communicated, step 522 determines whether the update has been completed. If the update has not been completed, step 518 continues updating the file. If the update to the file has been completed and a current file has been requested in step 524, the old version of the file is removed in step 526 and an updated file is communicated in step 528.

Referring back to step 524, if a file has not been requested, the system replaces the current file with the updated file then ends the process in step 532.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification and the following claims.

What is claimed is:

1. A method for comprising:
   allocating a bandwidth for an interactive broadcast;
   forming a queue corresponding to the bandwidth;
   scheduling the interactive broadcast to the queue;
   issuing a start command;
   pulling content from an interactive content manager using a queue manager; and
   communicating the interactive content from the queue to a user device using the queue manager.

2. A method as recited in claim 1 wherein allocating a bandwidth comprises allocating a bandwidth at a broadcast operation management system and communicating a bandwidth allocation to a queue.

3. A method as recited in claim 1 wherein allocating a bandwidth comprises allocating a bandwidth at a broadcast operation management system and communicating a bandwidth allocation to a queue and an interactive content system.

4. A method as recited in claim 1 further comprising storing content in the interactive content manager in a file-based system.

5. A method as recited in claim 1 further comprising updating content in the interactive manager prior to pulling content.

6. A method as recited in claim 1 wherein updating content forming an updating file and updating the updating file.

7. A method as recited in claim 6 further comprising replacing a current file with the updating file after updating the updating file.

8. A method as recited in claim 1 further comprising formatting content in the interactive manager prior to pulling content.

9. A method as recited in claim 1 further comprising injecting content in the interactive manager prior to pulling content.

10. A method as recited in claim 1 further comprising assigning a service channel identifier to a queue.

11. A method as recited in claim 1 wherein broadcasting content comprises streaming content to a transport system from the queue.

12. A method as recited in claim 1 further comprising communicating a start command and a stop command to a queue manager.

13. A method as recited in claim 1 wherein communicating the interactive content comprises communicating the interactive content through a satellite.

14. A method as recited in claim 1 wherein communicating the interactive content comprises communicating the interactive content through a transport processing system.

15. A method as recited in claim 1 wherein communicating the interactive content comprises communicating the interactive content through a broadband system.

16. A system for communicating with a user device comprising:
   an interactive headend having an interactive content manager, an interactive event scheduler and queue manager communicating with a queue;
   a broadcast channel management system communicating bandwidth allocation data to the interactive headend;
   wherein said interactive headend forms a queue corresponding to the bandwidth allocation data, said interactive event scheduler schedules the interactive broadcast with the queue, issues a start command, said queue manager pulls interactive content from the interactive content manager and communicates the interactive content from the queue to the user device.

17. A system as recited in claim 16 wherein the queue manager pulls interactive content from a file based system of the interactive content manager.

18. A system as recited in claim 16 wherein the queue manager pulls content the interactive content manager in chunks of data.

19. A system as recited in claim 16 wherein the broadcast channel management system communicates the bandwidth allocation to the queue manager and the interactive event scheduler.

20. A system as recited in claim 16 wherein the interactive content manager stores interactive content therein.

21. A system as recited in claim 16 wherein the interactive content manager updates the prior to pulling content.

22. A system as recited in claim 16 wherein the interactive content manager formats content to communicating the interactive content to the queue manager.

23. A system as recited in claim 16 wherein the interactive content manager injects content in the interactive manager prior to pulling content.

24. A system as recited in claim 16 further comprising assigning a service channel identifier to a queue.

25. A system as recited in claim 16 further comprising a transport processing system communicating interactive content from the queue through a satellite.

* * * * *